(12) United States Patent
Gilbertson et al.

(10) Patent No.: US 6,905,174 B1
(45) Date of Patent: Jun. 14, 2005

(54) SAFETY SUPPORT DEVICE AND METHOD OF USING

(76) Inventors: Lanny R. Gilbertson, P.O. Box 187, Blanchardville, WI (US) 53516;
Marcine L. Gilbertson, P.O. Box 187, Blanchardville, WI (US) 53516

( * ) Notice: Subject to any disclaimer, the term of this patent is extended or adjusted under 35 U.S.C. 154(b) by 59 days.

(21) Appl. No.: 10/679,582

(22) Filed: Oct. 6, 2003

(51) Int. Cl.[7] ................................................ B60P 1/04
(52) U.S. Cl. ................................................ 298/17 B
(58) Field of Search ........................... 298/17 B, 17 R; 248/351, 354.3, 354.5; 280/763.1

(56) References Cited

U.S. PATENT DOCUMENTS

| | | | | |
|---|---|---|---|---|
| 2,082,139 A | * | 6/1937 | Bassetti | |
| 3,157,435 A | * | 11/1964 | Sherven | 298/17 B |
| 3,183,037 A | * | 5/1965 | Reichert | 298/38 |
| 3,813,124 A | * | 5/1974 | Roland | 298/17 B |
| 4,218,094 A | * | 8/1980 | Leaver | 298/17 B |
| 4,305,619 A | * | 12/1981 | Sas | 298/17 B |
| 4,779,931 A | * | 10/1988 | Miller et al. | 298/17 B |
| D300,309 S | * | 3/1989 | Miller et al. | |
| 5,405,181 A | * | 4/1995 | Watkins et al. | 298/17 B |
| 6,471,299 B2 | * | 10/2002 | Brooks et al. | 298/17 B |

* cited by examiner

*Primary Examiner*—Stephen Gordon

(57) ABSTRACT

A safety support device and an associated method of using the safety support device are disclosed. The safety support device is for securing a dump body pivotally mounted on a truck chassis frame in an elevated position above the chassis frame, in which the safety support device is positionable on the truck chassis frame when the dump body is in the elevated position. The safety support device includes the interconnected components of a base platform, a shank, a brace, a channel rest, a bolt, a nut, a first safety chain, a second safety chain, a first hook, and a second hook. The method of using the device includes the steps of fastening, hooking, looping, obtaining, placing, raising, resting, tightening, and wrapping.

10 Claims, 3 Drawing Sheets

SAFETY SUPPORT DEVICE AND METHOD OF USING

FIELD OF THE INVENTION

The present invention relates safety devices, more particularly to a safety support device and an associated method of using the device for safely securing a dump body pivotally mounted on a truck chassis frame in an elevated position above the chassis frame.

DESCRIPTION OF THE PRIOR ART

Trucks having a dump body pivotally mounted on a chassis-cab are commonly referred to as "dump trucks". In the conventional dump truck the dump body is located on the chassis frame rearward of the cab so that the front end of the dump bed can be selectively raised and lowered with respect to a rearward pivot point. When it is necessary for a mechanic or other laborer to work on various mechanisms of the dump truck, such as the drive shaft, various brake lines, the hoist, and the like, the dump body must generally be raised so that the mechanic can work thereunder and have access to the mechanisms being repaired or replaced.

In many instances the mechanic is required to lean over the chassis frame which places the mechanic's body in a dangerous position between the chassis frame and the dump body should the dump body descend unexpectedly. As a result, serious injuries and even death have resulted when the dump body accidentally descends from the dumping or raised position to a horizontal position. Because of the precarious position that the mechanic is often placed in while working on various mechanisms of the truck when the dump bed is in a raised position, it has become common knowledge among trained mechanics that the dump body should be blocked or propped when servicing or repairing the truck and the dump body is in the raised position. Various means have heretofore been proposed to block the dump body in a raised position, such as the use of large wood planks located at the pivot point to prevent unexpected decent of the dump body, or the use of an elongated wood planks or metal props to brace the body from its front end rather than at its pivot point.

A wide variety of safety support device is currently available on the commercial market and an even larger number of these types of devices are known in the art of safety support device, for example, the safety bracket for dump bodies disclosed by Bassetti in U.S. Pat. No. 2,082,139; the safety supporting device for dump truck bodies disclosed by Reichert in U.S. Pat. No. 3,183,037; the safety prop for dump truck bodies disclosed by Roland in U.S. Pat. No. 3,813,124; the safety brace disclosed by Leaver in U.S. Pat. No. 4,218,094; the dump bed safety prop disclosed by Sas in U.S. Pat. No. 4,305,619; the safety support and stop assembly disclosed by Miller and Miller in U.S. Pat. No. 4,779,931; and the universal safety blocks for dump trucks disclosed by Miller and Miller in U.S. Pat. No. D300,309.

While all of the above-described devices fulfill their respective, particular objectives and requirements, the aforementioned patents do not describe a safety support device having the interconnected components of a base platform, a shank, a brace, a channel rest, a bolt, a nut, a first safety chain, a second safety chain, a first hook, and a second hook. This combination of elements would specifically match the user's particular individual needs of making it possible to to use the device as a means for safely securing a dump body pivotally mounted on a truck chassis frame in an elevated position above the chassis frame, in which the safety support device is positionable on the truck chassis frame when the dump body is in the elevated position. The above-described patents make no provision for a safety support device having the interconnected components of a base platform, a shank, a brace, a channel rest, a bolt, a nut, a first safety chain, a second safety chain, a first hook, and a second hook.

Therefore, a need exists for a new and improved safety support device having the interconnected components of a base platform, a shank, a brace, a channel rest, a bolt, a nut, a first safety chain, a second safety chain, a first hook, and a second hook. In this respect, the safety support device according to the present invention substantially departs from the conventional concepts and designs of the prior art, and in doing so provides an apparatus primarily developed for the purpose of providing a means for safely securing a dump body pivotally mounted on a truck chassis frame in an elevated position above the chassis frame, in which the safety support device is positionable on the truck chassis frame when the dump body is in the elevated position.

SUMMARY OF THE INVENTION

The present device and the associated method of using the device, according to the principles of the present invention, overcomes the shortcomings of the prior art by providing a novel safety support device and associated method of using the novel device. The safety support device includes the interconnected components of a base platform, a shank, a brace, a channel rest, a bolt, a nut, a first safety chain, a second safety chain, a first hook, and a second hook. The method of using the device includes the steps of fastening, hooking, looping, obtaining, placing, raising, resting, tightening, and wrapping.

In view of the foregoing disadvantages inherent in the known type safety support devices now present in the prior art, the present invention provides an improved safety support device, which will be described subsequently in great detail, is to provide a new and improved safety support device which is not anticipated, rendered obvious, suggested, or even implied by the prior art, either alone or in any combination thereof.

To attain this, the present invention essentially comprises the interconnected components of a base platform, a shank, a brace, a channel rest, a bolt, a nut, a first safety chain, a second safety chain, a first hook, and a second hook.

There has thus been outlined, rather broadly, the more important features of the invention in order that the detailed description thereof that follows may be better understood, and in order that the present contribution of the art may be better appreciated.

The invention may also include optional washers. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved safety support device that has all the advantages of the prior art safety support device and none of the disadvantages.

It is another object of the present invention to provide a new and improved safety support device that may be easily and efficiently manufactured and marketed.

An even further object of the present invention is to provide a new and improved safety support device that has a low cost of manufacture with regard to both materials and labor, and which accordingly is then susceptible of low prices of sale to the consuming public, thereby making such multipurpose storage unit and system economically available to the buying public.

Still another object of the present invention is to provide a new safety support device that provides in the apparatuses and methods of the prior art some of the advantages thererof, while simultaneously overcoming some of the disadvantages normally associated therewith.

Even still another object of the present invention is to provide a safety support device having the interconnected components of a base platform, a shank, a brace, a channel rest, a bolt, a nut, a first safety chain, a second safety chain, a first hook, and a second hook. This combination of elements makes it possible to use the device as a means for safely securing a dump body pivotally mounted on a truck chassis frame in an elevated position above the chassis frame, in which the safety support device is positionable on the truck chassis frame when the dump body is in the elevated position.

Lastly, it is an object of the present invention to provide a new and improved method of using comprising the steps of fastening, hooking, looping, obtaining, placing, raising, resting, tightening, and wrapping.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
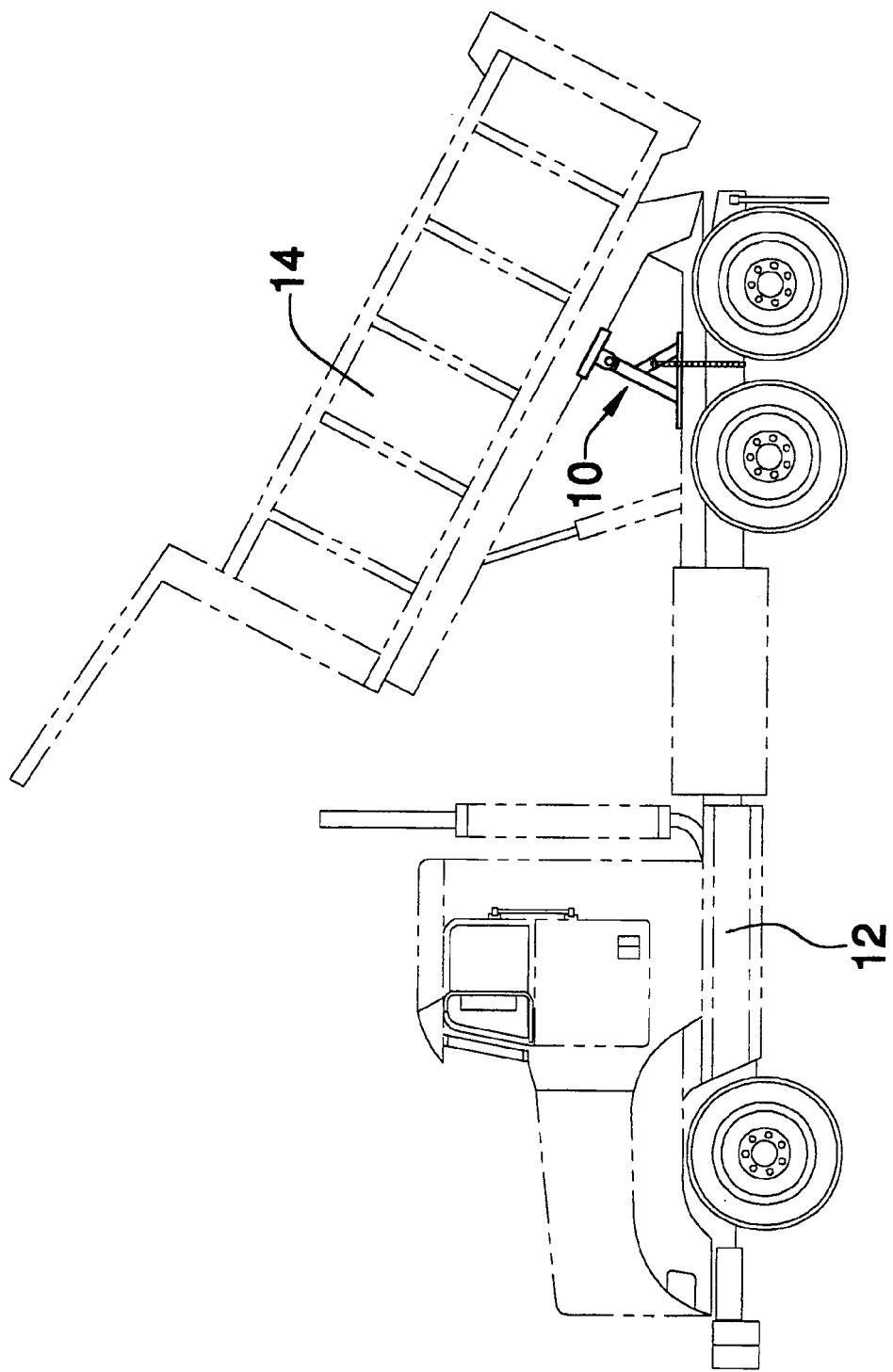
FIG. 1 is a side view of an preferred embodiment of the safety support device constructed in accordance with the principles of the present invention.
Figure 2:
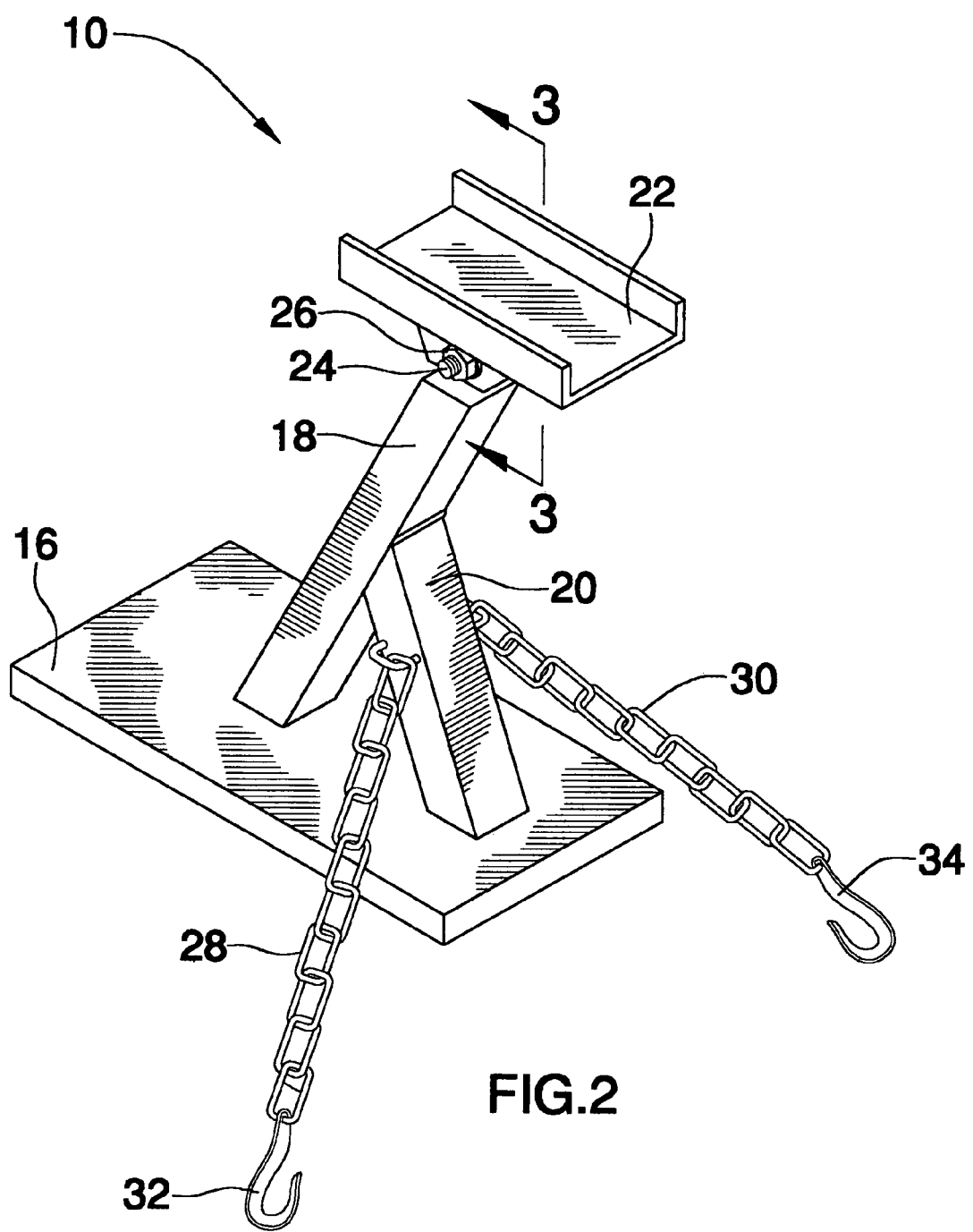
FIG. 2 is a perspective view of a preferred embodiment of the safety support device of the present invention.
Figure 3:
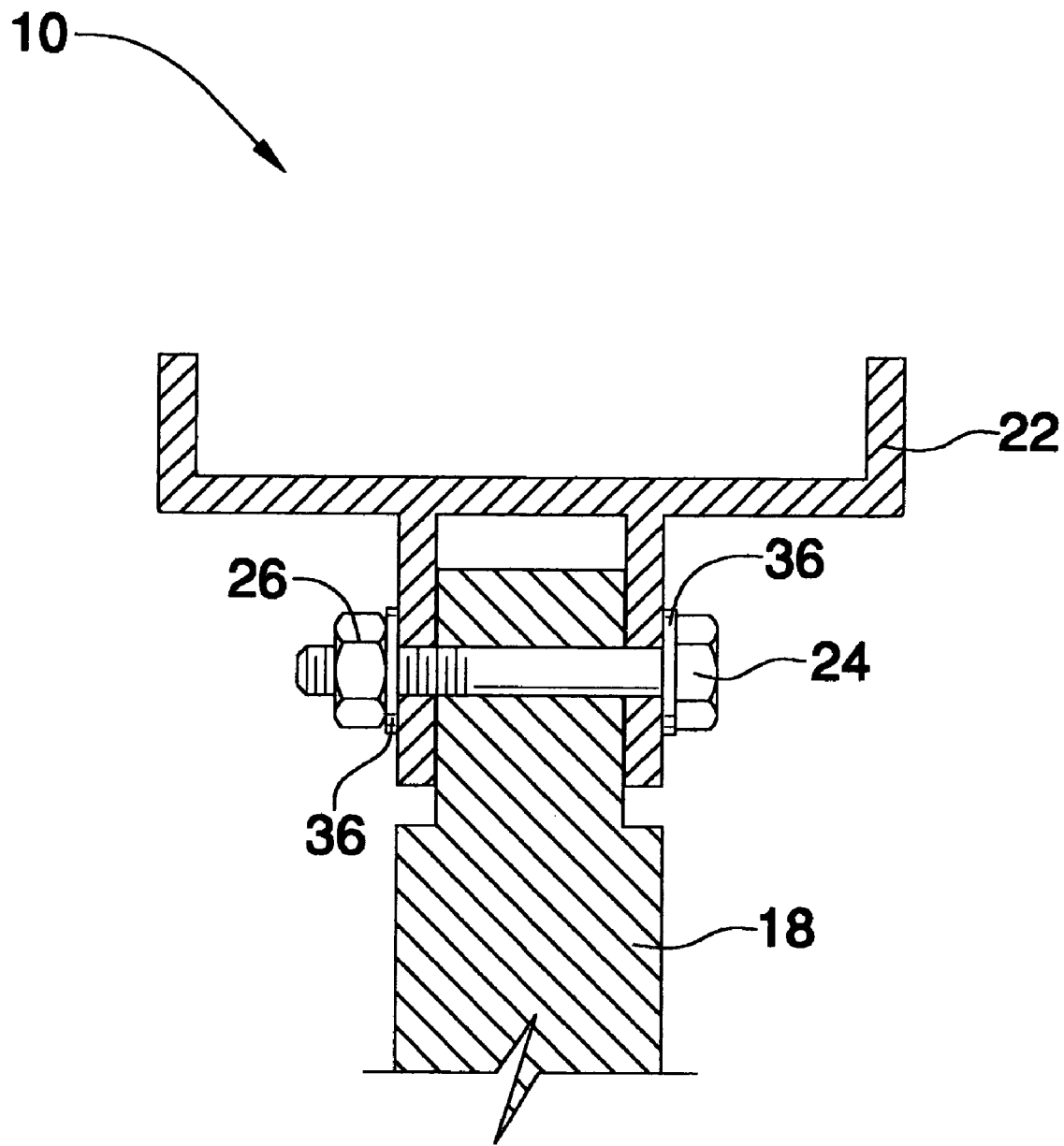
FIG. 3 is a cross sectional frontal view of a preferred embodiment of the safety support device of the present invention.

Referring now to the drawings, and in particular FIGS. 1 to 3 thereof, one preferred embodiment of the present invention is shown and generally designated by the reference numeral 10. One preferred embodiment of a safety support device 10 for securing a dump body 14 pivotally mounted on a truck chassis frame 12 in an elevated position above the chassis frame 12, said safety support device 10 positionable on the truck chassis frame 12 when the dump body 14 is in the elevated position, said safety support device 10 comprising: a base platform 16, a shank 18, a brace 20, a channel rest 22, a bolt 24, a nut 26, a first safety chain 28, a second safety chain 30, a first hook 32, and a second hook 34. The shank 18 has a bottom end, a middle portion, and a top end, in which the bottom end of said shank 18 is attached to said base platform 16. The brace 20 has a bottom end, a middle portion, and a top end, in which the bottom end of said brace 20 is attached to said base platform 16 and the top end of said brace 20 is attached to the middle portion of said shank 18. The channel rest 22 is pivotally attached to the top end of said shank 18. The bolt 24 attaches together said channel rest 22 to the top end of said shank 18. The nut 26 is attached to said bolt 24. The first safety chain 28 has a proximate and distal end, in which the proximate end of first said safety chain is attached to the middle portion of said brace 20. The second safety chain 30 has a proximate and distal end, in which the proximate end of said second safety chain 30 is attached to the middle portion of said brace 20. The first hook 32 is attached to the distal end of said first safety chain 28. The second hook 34 is attached to the distal end of said second safety chain 30.

An optional washer 36 may be added to the device 10 in which the washer 36 is attached to said bolt 24.

The shape of the channel rest 22 may be any commercially known configuration, in which one preferred configuration is that the channel rest 22 has a U-shaped cross section.

The device 10 may be made of any sturdy material, in which one preferred material is that the device 10 is made of steel.

Another preferred embodiment of the safety support device 10 consisting essentially of a base platform 16, a shank 18, a brace 20, a channel rest 22, a bolt 24, a nut 26, a first safety chain 28, a second safety chain 30, a first hook 32, a second hook 34, and a pair of washers 36. The shank 18 has a bottom end, a middle portion, and a top end, in which the bottom end of said shank 18 is attached to said base platform 16. The brace 20 has a bottom end, a middle portion, and a top end, in which the bottom end of said brace 20 is attached to said base platform 16 and the top end of said brace 20 is attached to the middle portion of said shank 18. The channel rest 22 is pivotally attached to the top end of said shank 18. The bolt 24 attaches together said channel rest 22 to the top end of said shank 18. The nut 26 is attached to said bolt 24. The first safety chain 28 has a proximate and distal end, in which the proximate end of first said safety chain is attached to the middle portion of said brace 20. The second safety chain 30 has a proximate and distal end, in which the proximate end of said second safety chain 30 is attached to the middle portion of said brace 20. The first hook 32 is attached to the distal end of said first safety chain 28. The second hook 34 is attached to the distal end of said second safety chain 30. The pair of washers 36 iss attached to said bolt 24.

One preferred embodiment of a method of using a safety support device 10 for securing a dump body 14 pivotally mounted on a truck chassis frame 12 in an elevated position above the chassis frame 12, wherein the safety support device 10 is positionable on the truck chassis frame 12 when the dump body 14 is in the elevated position, said method comprising the steps of: fastening, hooking, looping, obtaining, placing, raising, resting, tightening, and wrapping. The obtaining step comprises obtaining the safety support device 10 consisting essentially of: a base platform 16; a shank 18 having a bottom end, a middle portion, and a top end, the bottom end of said shank 18 is attached to said base platform 16; a brace 20 having a bottom end, a middle portion, and a top end, the bottom end of said brace 20 is attached to said base platform 16 and the top end of said brace 20 is attached to the middle portion of said shank 18; a channel rest 22 pivotally attached to the top end of said shank 18; a bolt 24 attaching together said channel rest 22 to the top end of said shank 18; a nut 26 attached to said bolt 24; a first safety chain 28 having a proximate and distal end, the proximate end of first said safety chain is attached to the middle portion of said brace 20; a second safety chain 30 having a proximate and distal end, the proximate end of said second safety chain 30 is attached to the middle portion of said brace 20; a first hook 32 attached to the distal end of said first safety chain 28; and a second hook 34 attached to the distal end of said second safety chain 30. The raising step comprises raising the dump body 14 into the elevated position above the truck chassis frame 12. The placing step comprises placing the base platform 16 of the device 10 onto the truck chassis frame 12. The wrapping step comprises wrapping the first safety chain 28 around a first portion of the truck chassis frame 12. The hooking step comprises hooking the first hook 32 onto the wrapped first safety chain 28. The looping step comprises looping the second safety chain 30 around a second portion of the truck chassis frame 12. The fastening step comprises fastening the second hook 34 onto the looped second safety chain 30. The resting step comprises resting the dump body 14 onto the channel rest 22 of the device 10. The tightening step comprises tightening the nut 26 and bolt 24 so that the channel rest 22 is secured to the top end of the shank 18.

An additional optional set of steps may be added to the above method further comprising the steps of inspecting, and lubricating. The lubricating step comprises lubricating the truck chassis frame 12 when the dump body 14 is resting on the channel rest 22 of the device 10. The inspecting step comprises inspecting a lower section of the dump body 14 when the dump body 14 is resting on the channel rest 22 of the device 10.

Yet additional optional set of steps may be added to the above method further comprising the steps of lifting, removing, unfastening, unhooking, un-looping, and unwrapping. The lifting step comprises lifting the dump body 14 above the channel rest 22 of the device 10. The unfastening step comprises unfastening the second hook 34 from the looped second safety chain 30. The un-looping step comprises un-looping the second safety chain 30 from the second portion of the truck chassis frame 12. The unhooking step comprises unhooking the first hook 32 from the wrapped first safety chain 28. The unwrapping step comprises unwrapping the first safety chain 28 from the first portion of the truck chassis frame 12. The removing step comprises removing the device 10 from the truck chassis frame 12.

Still yet additional optional set of steps may be added to the above method further comprising the steps of lowering, and storing. The storing step comprises storing the device 10 in a workshop. The lowering step comprises lowering the dump body 14 onto the truck chassis frame 12.

Another preferred embodiment of the method comprises the steps of fastening, hooking, inspecting, looping, lubricating, obtaining, placing, raising, resting, tightening, and wrapping.

Still another preferred embodiment of the method comprises the steps of fastening, hooking, inspecting, lifting, looping, lubricating, obtaining, placing, raising, removing, resting, tightening, unfastening, unhooking, un-looping, and unwrapping and wrapping.

Yet another preferred embodiment of the method comprises the steps of fastening, hooking, inspecting, lifting, looping, lowering, lubricating, obtaining, placing, raising, removing, resting, storing, tightening, unfastening, unhooking, un-looping, and unwrapping and wrapping.

Referring now to FIG. 1 which depicts a side view of an preferred embodiment of the safety support device 10 shown securing up the dump body 14 from the truck chassis frame 12.

Referring now to FIG. 2 which depicts a perspective view of a preferred embodiment of the safety support device 10 showing a base platform 16, a shank 18, a brace 20, a channel rest 22, a bolt 24, a nut 26, a first safety chain 28, a second safety chain 30, a first hook 32, and a second hook 34. The shank 18 is shown having a bottom end, a middle portion, and a top end, in which the bottom end of said shank 18 is attached to said base platform 16. The brace 20 is shown having a bottom end, a middle portion, and a top end, in which the bottom end of said brace 20 is shown attached to said base platform 16 and the top end of said brace 20 is shown attached to the middle portion of said shank 18. The channel rest 22 is pivotally attached to the top end of said shank 18. The bolt 24 attaches together said channel rest 22 to the top end of said shank 18. The nut 26 is shown attached to said bolt 24. The first safety chain 28 is shown having a proximate and distal end, in which the proximate end of first said safety chain is shown attached to the middle portion of said brace 20. The second safety chain 30 is shown having a proximate and distal end, in which the proximate end of said second safety chain 30 is shown attached to the middle portion of said brace 20. The first hook 32 is shown attached to the distal end of said first safety chain 28. The second hook 34 is shown attached to the distal end of said second safety chain 30.

Referring now to FIG. 3 which depicts a cross sectional frontal view of a preferred embodiment of the safety support device 10 showing the bolt 24 attaching together said channel rest 22 to the top end of said shank 18. The nut 26 is shown attached to said bolt 24. The pair of washers 36 are shown attached to the bolt 24.

As to the manner of usage and operation of the present invention, the same should be apparent from the above description. Accordingly, no further discussion relating to the manner of usage and operation will be provided.

While a preferred embodiment of the safety support device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A safety support device for securing a dump body pivotally mounted on a truck chassis frame in an elevated position above the chassis frame, said safety support device positionable on the truck chassis frame when the dump body is in the elevated position, said safety support device comprising:
   a base platform;
   a shank having a bottom end, a middle portion, and a top end, the bottom end of said shank is attached to said base platform;
   a brace having a bottom end, a middle portion, and a top end, the bottom end of said brace is attached to said base platform and the top end of said brace is attached to the middle portion of said shank;
   a channel rest pivotally attached to the top end of said shank;
   a bolt attaching together said channel rest to the top end of said shank;
   a nut attached to said bolt;
   a first safety chain having a proximate and distal end, the proximate end of said first safety chain is attached to the middle portion of said brace;
   a second safety chain having a proximate and distal end, the proximate end of said second safety chain is attached to the middle portion of said brace;
   a first hook attached to the distal end of said first safety chain; and
   a second hook attached to the distal end of said second safety chain.

2. The device of claim 1 further comprising at least one washer attached to said bolt.

3. The device of claim 1 wherein said channel rest having a U-shaped cross section.

4. The device of claim 1 wherein said device is made of steel.

5. A safety support device for securing a dump body pivotally mounted on a truck chassis frame in an elevated position above the chassis frame, said safety support device positionable on the truck chassis frame when the dump body is in the elevated position, said safety support device comprising of:
   a base platform;
   a shank having a bottom end, a middle portion, and a top end, the bottom end of said shank is attached to said base platform;
   a brace having a bottom end, a middle portion, and a top end, the bottom end of said brace is attached to said base platform and the top end of said brace is attached to the middle portion of said shank;
   a channel rest pivotally attached to the top end of said shank;
   a bolt attaching together said channel rest to the top end of said shank;
   a nut attached to said bolt;
   a said first safety chain having a proximate and distal end, the proximate end of first said safety chain is attached to the middle portion of said brace;
   a second safety chain having a proximate and distal end, the proximate end of said second safety chain is attached to the middle portion of said brace;
   a first hook attached to the distal end of said first safety chain;
   a second hook attached to the distal end of said second safety chain; and
   a pair of washers attached to said bolt.

6. The device of claim 5 wherein said device is made of steel.

7. A method of using a safety support device for securing a dump body pivotally mounted on a truck chassis frame in an elevated position above the chassis frame, wherein the safety support device is positionable on the truck chassis frame when the dump body is in the elevated position, said method comprising the steps of:
   obtaining the safety support device comprising of:
      a base platform;
      a shank having a bottom end, a middle portion, and a top end, the bottom end of said shank is attached to said base platform;
      a brace having a bottom end, a middle portion, and a top end, the bottom end of said brace is attached to said base platform and the top end of said brace is attached to the middle portion of said shank;
      a channel rest pivotally attached to the top end of said shank;
      a bolt attaching together said channel rest to the top end of said shank;

a nut attached to said bolt;

a said first safety chain having a proximate and distal end, the proximate end of first said safety chain is attached to the middle portion of said brace;

a second safety chain having a proximate and distal end, the proximate end of said second safety chain is attached to the middle portion of said brace;

a first hook attached to the distal end of said first safety chain; and a second hook attached to the distal end of said second safety chain;

raising the dump body into the elevated position above the truck chassis frame;

placing the base platform of the device onto the truck chassis frame;

wrapping the first safety chain around a first portion of the truck chassis frame;

hooking the first hook onto the wrapped first safety chain;

looping the second safety chain around a second portion of the truck chassis frame;

fastening the second hook onto the looped second safety chain;

resting the dump body onto the channel rest of the device; and tightening the nut and bolt so that the channel rest is secured to the top end of the shank.

8. The method of claim 7 further comprising the steps of:

lubricating the truck chassis frame when the dump body is resting on the channel rest of the device; and inspecting a lower section of the dump body when the dump body is resting on the channel rest of the device.

9. The method of claim 8 further comprising the steps of:

lifting the dump body above the channel rest of the device;

unfastening the second hook from the looped second safety chain;

un-looping the second safety chain from the second portion of the truck chassis frame;

unhooking the first hook from the wrapped first safety chain;

unwrapping the first safety chain from the first portion of the truck chassis frame;

removing the device from the truck chassis frame.

10. The method of claim 9 further comprising the steps of:

storing the device in a workshop; and lowering the dump body onto the truck chassis frame.

* * * * *